(12) United States Patent
Cohen

(10) Patent No.: US 6,365,985 B1
(45) Date of Patent: Apr. 2, 2002

(54) ELECTRICITY GENERATION FROM AIR CONDITIONING EXHAUST

(76) Inventor: Lawrence J. Cohen, 112 Tupelo Hill Dr., Cranston, RI (US) 02920

( * ) Notice: Subject to any disclaimer, the term of this patent is extended or adjusted under 35 U.S.C. 154(b) by 0 days.

(21) Appl. No.: 09/644,758

(22) Filed: Aug. 23, 2000

(51) Int. Cl.[7] .................................................. F03D 9/00
(52) U.S. Cl. ............................ 290/55; 290/54; 62/409
(58) Field of Search ............................ 290/54, 55, 1 R, 290/1 A; 62/309, 409

(56) References Cited

U.S. PATENT DOCUMENTS

| | | | | |
|---|---|---|---|---|
| 4,660,390 A | * | 4/1987 | Worthington | 62/309 |
| 4,892,138 A | * | 1/1990 | Bibik, Jr. | 165/41 |
| 4,996,850 A | * | 3/1991 | Boxum et al. | 137/625.45 |
| 5,512,788 A | | 4/1996 | Berenda | 290/55 |
| 6,097,104 A | * | 8/2000 | Russell | 290/1 R |

* cited by examiner

*Primary Examiner*—Nicholas Ponomarenko

(57) ABSTRACT

An electricity generator powered by air conditioner exhaust having a wind turbine and a bracket to hold the wind turbine in a relatively fixed position, to an air conditioner exhaust. The wind turbine has a propeller with two or more blades, a shaft and a generator. The bracket holds the wind turbine so the blades are turned by exhaust air from the air conditioner. The bracket can be a shroud. The invention includes the method of generating electricity from air conditioning exhaust by holding a wind turbine in a relatively fixed proximity to an air conditioning exhaust port.

5 Claims, 2 Drawing Sheets

ELECTRICITY GENERATION FROM AIR CONDITIONING EXHAUST

TECHNICAL FIELD

The technical field of this invention concerns electricity generation from air conditioning exhaust.

BACKGROUND

Windmills, or wind turbines which generate electricity from the wind are well-known. Increasing efficiency of such generators and increased cost of traditional fossil fuel energy sources have lead to significant use and commercial development of wind-driven generators relying on natural air movements. Such windmills frequently are placed in windy areas and mounted on tall posts or columns. These windmills may rotate to face changing wind directions.

Other wind-driven electric generating systems have used air intakes to drive the windmills. Recent inventions have attempted to collect moving air created by traveling motor vehicles to generate electricity.

Berenda and Ferenci were awarded U.S. Pat. No. 5,512,788 for a system which utilizes wasted or exhaust air flow from one or more ventilation systems of a bounded area such as a mine, a tunnel or some other area requiring ventilation. Their system utilizes existing wind-powered electric generating equipment in front of the exhaust fan of the ventilation systems.

Known wind powered electric generating systems, however, have not utilized exhaust air from relatively low volume non-ventilation sources typically found in air conditioner exhaust. The present invention utilizes such low volume air flows to generate electricity.

SUMMARY OF THE INVENTION

The present invention includes an existing wind powered generator and a means of mounting the generator in proximity to the exhaust outlet. And alternative includes a shroud sized to fit and connect to an air-conditioning exhaust port. The air conditioner is not a part of this invention. The shroud directs the air conditioner fan exhaust flow to a wind turbine, having two or more blades positioned in the air flow, so when the air flow passes over the blades, the shaft of the turbine is spun and electricity is generated thereby. The shroud also serves to protect anyone around or near the turbine from injury by the blades spinning in the exhaust fan airflow.

A BRIEF DESCRIPTION OF THE DRAWINGS

These and other features, aspects and advantages of the present invention will become better understood with regard to the following descriptions, and its drawings where:

DESCRIPTION OF THE BEST MODE

Figure 1:
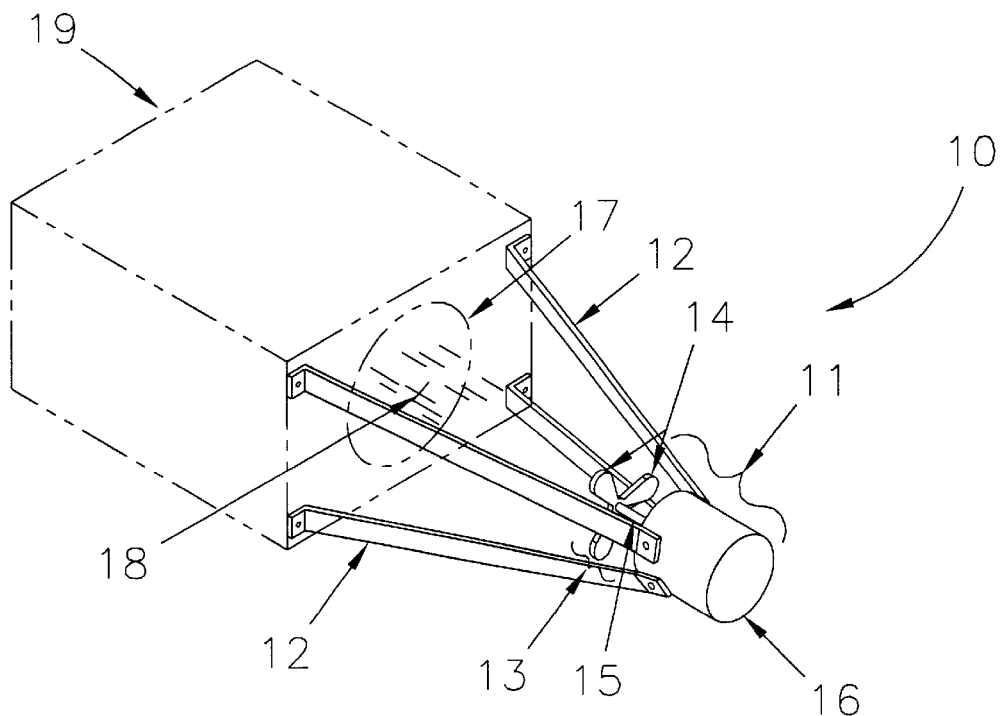
FIG. 1 shows a perspective view of the bracket and wind turbine.
Figure 4:
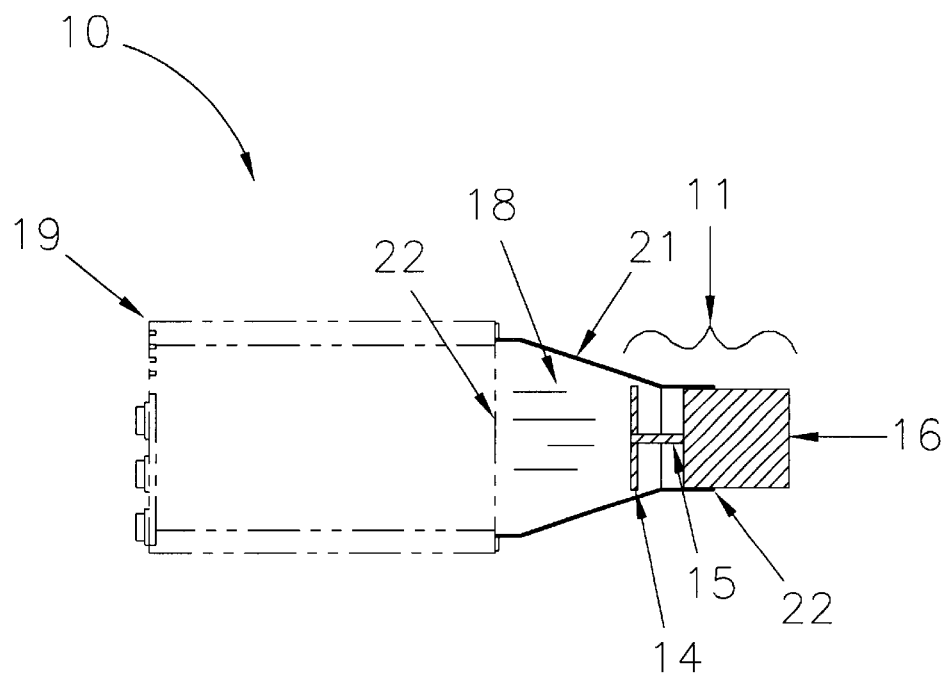
FIG. 4 shows a sectional view of the shroud and turbine along the 3—3 axis in FIG. 2.

As shown in FIGS. 1 and 4, the present invention 10 has a wind turbine 11 and bracket 12. The wind turbine 11 has a propeller 13 with two or more blades 14. The propeller will be connected to a shaft 15, which shaft will be connected to a generator 16. A wide variety of known turbines and generators can be used, the limitation being that they must be sized to the air flow from the exhaust fan.

Figure 2:
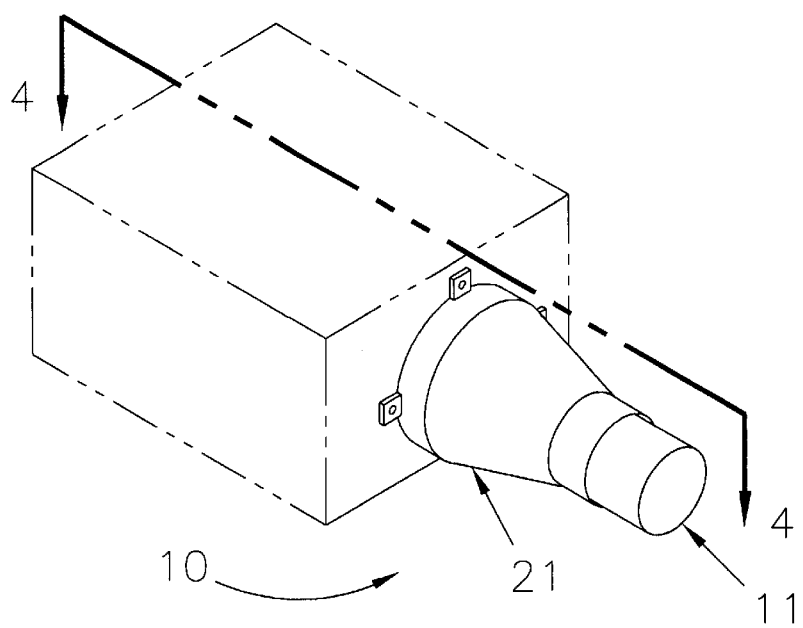
FIG. 2 shows a perspective view of the shroud and turbine.
Figure 3:
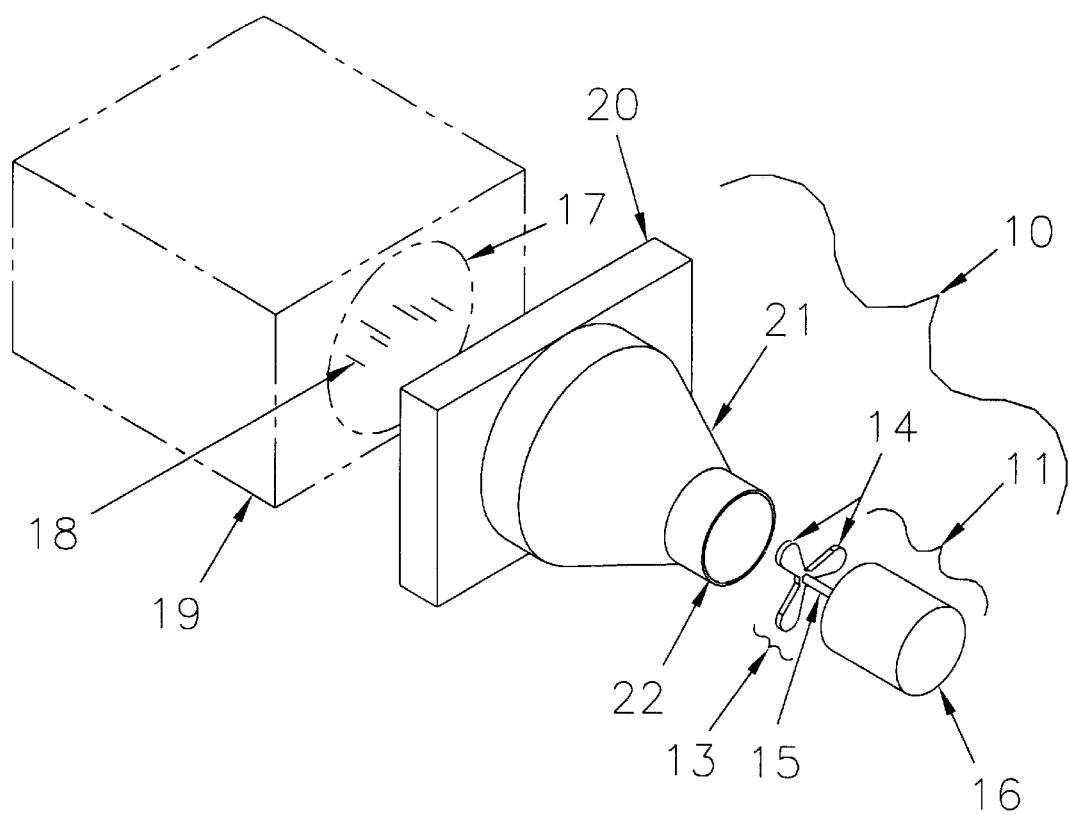
FIG. 3 shows a exploded perspective view of the shroud and wind turbine.

The bracket holds the generator in a fixed position relative to the air conditioner exhaust port 17, so that the air conditioner exhaust stream 18 blows over and propels the propeller (13). The bracket can be metal braces 12 attached to the air conditioner 19, or to the surface on which the air conditioner is mounted, or can be a shroud 21. The shroud (21) has two opposing ends 22 with the wind turbine(11) connected to one opposing end of the shroud (22). The shroud is connected to an air conditioner exhaust port (17) at the other opposing end (22). The shroud (21) may include a cap box 20 sized to fit the air conditioner (19), as shown in FIG. 3, or may be sized to fit the air conditioner exhaust port (17) without a cap box (20), as shown in FIG. 2. The air conditioner is not an element of this invention. The shroud is sized to fit the air conditioner exhaust port (17) and propeller (13).

The shroud (21) should be sufficiently airtight to prevent excessive leakage of the exhaust air, and to direct the exhaust air toward the wind turbine. The length of the shroud will vary with the size of the air conditioner.

I claim:

1. An electricity generator powered by air conditioning exhaust comprising: a wind turbine having a propeller with two or more blades, a generator, and a shaft connecting the propeller and generator; and a bracket holding the wind turbine in proximity to an air conditioner exhaust port so that air flowing from the air conditioner exhaust port causes the blades and shaft to spin and the generator to generate electricity.

2. The electricity generator powered by air conditioning exhaust of claim 1 in which the bracket is a shroud having two opposing ends, one of which is sized to fit the blades and the other sized to fit the air conditioning exhaust port.

3. The electricity generator powered by air conditioning exhaust of claim 2, in which shroud includes a cap box.

4. A method of generating electricity from air conditioning exhaust by using a bracket to hold a wind turbine in proximity to an air conditioner exhaust port, the wind turbine having a propeller with blades, a generator, and a shaft connecting the propeller and generator.

5. The method of claim 3 in which the bracket is a shroud having two opposing ends, one of which is sized to fit the propeller and the other of which is sized to fit the air conditioner exhaust port.

\* \* \* \* \*